United States Patent
Lee et al.

(10) Patent No.: US 11,297,243 B2
(45) Date of Patent: Apr. 5, 2022

(54) ELECTRONIC DEVICE AND METHOD FOR PROVIDING CONTENT ASSOCIATED WITH CAMERA FUNCTION FROM ELECTRONIC DEVICE

(71) Applicant: Samsung Electronics Co., Ltd., Gyeonggi-do (KR)

(72) Inventors: Woo-Yong Lee, Gyeonggi-do (KR); Jun-Young Park, Gyeonggi-do (KR); Seong-Hun Cho, Gyeonggi-do (KR); Ki-Huk Lee, Gyeonggi-do (KR)

(73) Assignee: Samsung Electronics Co. Ltd

( * ) Notice: Subject to any disclaimer, the term of this patent is extended or adjusted under 35 U.S.C. 154(b) by 5 days.

(21) Appl. No.: 16/641,027

(22) PCT Filed: Aug. 22, 2018

(86) PCT No.: PCT/KR2018/009658
§ 371 (c)(1),
(2) Date: Feb. 21, 2020

(87) PCT Pub. No.: WO2019/039861
PCT Pub. Date: Feb. 28, 2019

(65) Prior Publication Data
US 2021/0029300 A1    Jan. 28, 2021

(30) Foreign Application Priority Data
Aug. 22, 2017    (KR) .................. 10-2017-0106263

(51) Int. Cl.
*H04N 5/232*    (2006.01)
(52) U.S. Cl.
CPC ............... *H04N 5/232939* (2018.08); *H04N 5/232933* (2018.08)

(58) Field of Classification Search
CPC ....... H04N 5/232939; H04N 5/232933; H04N 5/272; H04N 5/23216; H04N 2005/2726;
(Continued)

(56) References Cited

U.S. PATENT DOCUMENTS

| | | | |
|---|---|---|---|
| 5,757,908 A | 5/1998 | Cooper et al. | |
| 9,460,462 B1 * | 10/2016 | Walker | ................ A45D 44/005 |

(Continued)

FOREIGN PATENT DOCUMENTS

| | | |
|---|---|---|
| JP | 2006041566 | 2/2006 |
| KR | 1020010038390 | 5/2001 |

(Continued)

OTHER PUBLICATIONS

PCT/ISA/210 Search Report issued on PCT/KR2018/009658, pp. 5.
(Continued)

*Primary Examiner* — Timothy J Henn
(74) *Attorney, Agent, or Firm* — The Farrell Law Firm, P.C.

(57) ABSTRACT

An electronic device is disclosed that includes a display; a camera module; a communication module; and a processor. The processor can be set to use the communication module to obtain, from an external device, a plurality of images corresponding to a plurality of contents and data relating to at least part of the plurality of contents, and display, through the display, an image obtained using the camera module; display at least part of the plurality of images on a designated area on the display while displaying the image obtained using the camera module; and when an input associated with a first image from among the at least part of the plurality of images, use the data to display a graphic image on an area corresponding to a selected object included in the image obtained using the camera module.

11 Claims, 14 Drawing Sheets

(58) Field of Classification Search
CPC .... H04N 5/23293; H04N 5/225; H04N 5/265; H04N 5/2257; G06F 3/0481; G06F 3/0484; G06F 3/0488; G06F 3/04817; G06F 3/04842
See application file for complete search history.

(56) References Cited

U.S. PATENT DOCUMENTS

| | | | |
|---|---|---|---|
| 2005/0219384 A1* | 10/2005 | Herberger | G06T 1/0007 348/239 |
| 2006/0167817 A1 | 7/2006 | Gajjala et al. | |
| 2008/0148153 A1* | 6/2008 | Lee | G11B 27/034 715/730 |
| 2012/0023254 A1 | 1/2012 | Park et al. | |
| 2012/0054214 A1 | 3/2012 | Yamagishi et al. | |
| 2013/0185679 A1* | 7/2013 | Fretwell | G06F 3/017 715/862 |
| 2016/0196052 A1* | 7/2016 | Franklin | G06F 3/04845 715/765 |
| 2017/0358116 A1* | 12/2017 | Cheng | G06K 9/00281 |
| 2018/0268572 A1* | 9/2018 | Nishi | A45D 44/005 |
| 2019/0246065 A1* | 8/2019 | Lee | G06Q 30/02 |
| 2019/0297271 A1* | 9/2019 | Tomita | H04N 5/232127 |

FOREIGN PATENT DOCUMENTS

| | | |
|---|---|---|
| KR | 1020030049670 | 6/2003 |
| KR | 1020030095790 | 12/2003 |
| KR | 1020060058497 | 5/2006 |
| KR | 1020120010090 | 2/2012 |

OTHER PUBLICATIONS

PCT/ISA/237 Written Opinion issued on PCT/KR2018/009658, pp. 5.

KR Notice of Patent Grant dated Sep. 29, 2021 issued in counterpart application No. 10-2017-0106263, 8 pages.

* cited by examiner

| Field Name | | Details |
|---|---|---|
| version | content Version | · data format : integer greater than or equal to 1<br>· mandatory (should be described) |
| name | content Name | · data format : character string<br>· mandatory (should be described) |
| effect | value for applying effect | · data format : parameter of effect<br>· optional (effect is not applied when not described) |
| transformList | transform list | · data format : transformList array (MAX:5)<br>· optional (transform is not applied when not described) |
| sound | event value for playing sound | · data format : character string<br>· optional (sound is not applied when not described) |
| componentList | content component list | · data format : componentList array<br>· mandatory (should be described) |
| sequenceList | content sequence list to be used for event | · data format : scene array (MAX:3)<br>· mandatory (should be described) |

FIG.9A

| Field Name | | Details |
|---|---|---|
| contrast | contrast parameter | · data format : Integer greater than or equal to -10 and less than or equal to +10<br>0 in case of non-application of contrast<br>· mandatory (should be described) |
| saturate | saturate parameter | · data format : Integer greater than or equal to -10 and less than or equal to +10<br>0 in case of non-application of saturation<br>· mandatory (should be described) |
| exposure | exposure parameter | · data format : Integer greater than or equal to -10 and less than or equal to +10<br>0 in case of non-application of exposure<br>· mandatory (should be described) |
| fade | fade parameter | · data format : integer greater than or equal to 0 and less than or equal to 20<br>0 in case of non-application of fade<br>· mandatory (should be described) |
| black/white | black/white Mode parameter | · data format : 0,1<br>1 in case of application of black-white mode<br>· mandatory (should be described) |

FIG.9B

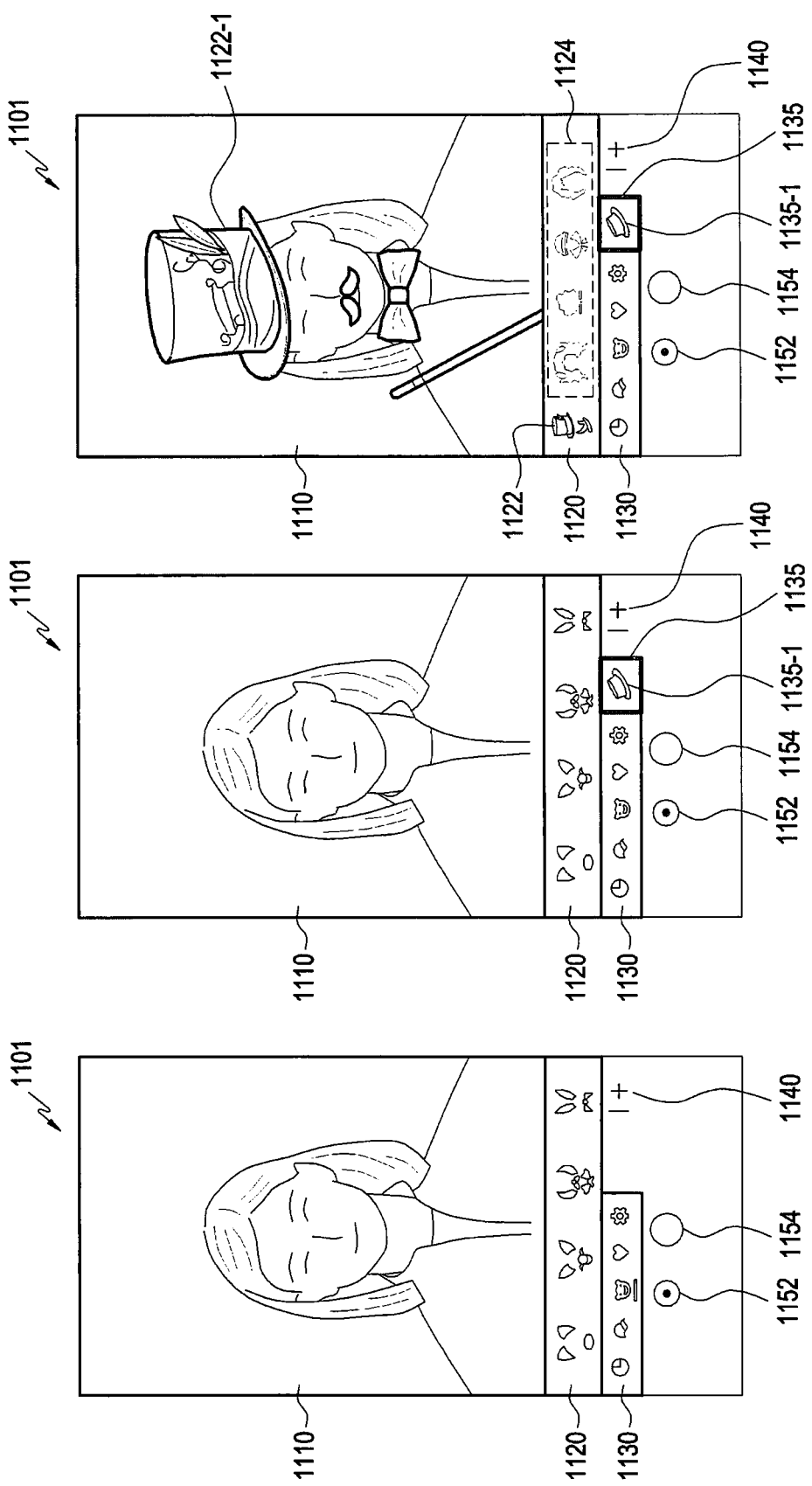

ELECTRONIC DEVICE AND METHOD FOR PROVIDING CONTENT ASSOCIATED WITH CAMERA FUNCTION FROM ELECTRONIC DEVICE

CROSS-REFERENCE TO RELATED APPLICATION(S)

This application is a National Phase Entry of PCT International Application No. PCT/KR2018/009658, which was filed on Aug. 22, 2018 and claims priority to Korean Patent Application No. 10-2017-0106263, which was filed on Aug. 22, 2017, the contents of which are incorporated herein by reference.

BACKGROUND

1. Field

Various embodiments of the present disclosure relate to an electronic device and a method for providing contents associated with a camera function of the electronic device.

2. Description of the Related Art

Recently, various electronic devices have been provided to users who may enjoy various contents while carrying the various electronic devices with them. The electronic device may obtain various contents from an external server, e.g., a server, and provide them to the users. The electronic device may obtain and provide one content or may obtain and provide a content package including a plurality of contents. The content package may be provided as, for example, an Android application package (APK).

SUMMARY

An electronic device may be provided with content or content package information from a server through a content purchase and download application allowing content acquisition, and purchase and download content or a content package requested by a user to be purchased. The electronic device may download the content or content package and use the downloaded content or content included in the downloaded content package.

The electronic device has to execute the content purchase and download application so as to be provided with the content or content package information, and there is no way to be provided with the content or content package information without using the content purchase and download application.

For example, to acquire the content or content package information associated with a camera function in an executed state of a camera application, it may be troublesome to execute the content purchase and download application that is separate from the camera application, and it may also be inconvenient to search for the content or content package information associated with the camera function through the content purchase and download application.

To use the content or content package associated with the camera function before purchase, the electronic device may execute a separate content purchase and download application to download the content or content package associated with the camera function and then use the content or content package, such that the use of the content or content package associated with the camera function may not be possible without using the content purchase and download application.

Accordingly, various embodiments of the present disclosure provide an electronic device that may identify content or content package information associated with a camera function without executing a separate content purchase and download application in an executed state of a camera application, and a method for providing contents associated with the camera function in the electronic device.

Various embodiments of the present disclosure may also provide an electronic device that allows at least one of a plurality of contents included in a content package associated with a camera function to be used before purchase without executing a separate content purchase and download application in an executed state of a camera application, and a method for providing contents associated with the camera function in the electronic device.

An electronic device according to various embodiments of the present disclosure may include a display, a camera module, a communication module, and a processor, in which the processor is configured to obtain a plurality of images corresponding to a plurality of contents and data regarding at least part of the plurality of contents from an external device, by using the communication module, to display an image obtained using the camera module through the display, to display at least part of the plurality of images in a designated region of the display while displaying the image obtained using the camera module, and to display a graphic image in a region corresponding to a designated object included in the image obtained using the camera module, by using the data, upon obtaining an input related to a first image from among the at least part of the plurality of images.

A method for providing contents associated with a camera function in an electronic device according to various embodiments of the present disclosure may include obtaining a plurality of images corresponding to a plurality of contents and data regarding at least part of the plurality of contents from an external device, displaying an image obtained using a camera module through a display of the electronic device, displaying at least part of the plurality of images in a designated region of the display while displaying the image obtained using the camera module, and displaying a graphic image in a region corresponding to a designated object included in the image obtained using the camera module, by using the data, upon obtaining an input related to a first image from among the at least part of the plurality of images.

In a non-transitory storage medium having stored therein a program for providing contents associated with a camera function according to various embodiments of the present disclosure, the program causes the electronic device to perform operations of obtaining a plurality of images corresponding to a plurality of contents and data regarding at least part of the plurality of contents from an external device, displaying an image obtained using a camera module through a display of the electronic device, displaying at least part of the plurality of images in a designated region of the display while displaying the image obtained using the camera module, and displaying a graphic image in a region corresponding to a designated object included in the image obtained using the camera module, by using the data, upon obtaining an input related to a first image from among the at least part of the plurality of images.

According to various embodiments, an electronic device may be provided with content or content package information associated with a function of an application being executed, without using a separate content purchase and download application.

According to various embodiments, an electronic device may provide content or content package information associated with a camera function through a camera application, without executing a separate content purchase and download application in an executed state of a camera application.

According to various embodiments, an electronic device may use a content or content package associated with a camera function in advance without executing a separate content purchase and download application even when the use of the content or content package is before purchase is intended. For example, the electronic device may allow pre-use of sticker image content applicable to an image obtained by a camera, without executing a separate content purchase and download application in an executed state of a camera application, thus helping a user to determine whether to purchase the sticker image content.

BRIEF DESCRIPTION OF THE DRAWINGS

FIGS. 9A and 9B are views for describing an information file included in a content package, according to various embodiments.

FIG. 11 illustrates an example of requesting content package information on a preview screen that displays an image obtained by a camera module, according to various embodiments.

DETAILED DESCRIPTION

Figure 1:
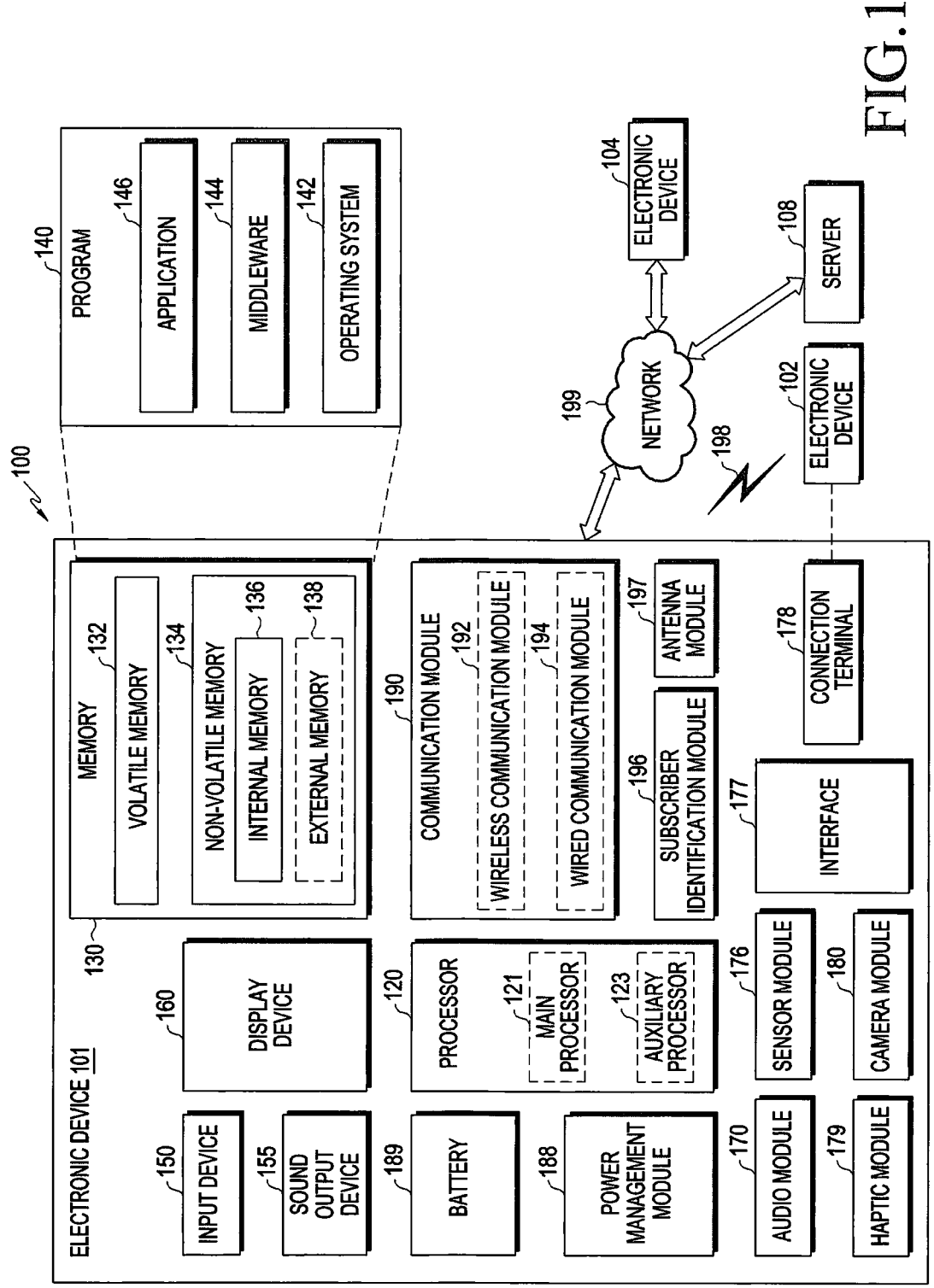
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or other components may be added in the electronic device 101. In some embodiments, some components may be implemented to be integrated together, e.g., as if the sensor module 176 (e.g., a fingerprint sensor, an iris sensor, or an illuminance sensor) is embedded in the display device 160 (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor (AP)) and an auxiliary processor 123 that is operable independently from the main processor 121. In addition to, or instead of, the main processor 121, the auxiliary processor 123 may include an auxiliary processor 123 (e.g., a graphics processing unit (GPU), an image signal processor, a sensor hub processor, or a communication processor) that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 50 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 160 may include, e.g., a display, a hologram device, or a projector and a control circuit for controlling the display, hologram device, or projector. According to an embodiment, the display 160 may include a touch circuitry or a pressure sensor capable of measuring the strength of a pressure with respect to a touch.

The audio module 170 may convert a sound into an electrical signal and vice versa. According to an embodiment, the audio module 170 may obtain the sound via the input device 150 or output the sound via the sound output device 155 or a headphone of an external electronic device (e.g., an electronic device 102) wiredly or wirelessly coupled with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his or her tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a GNSS communication module) or a wired communication module 194 (e.g., an LAN communication module or a power-line communication module), and may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., an LAN or wide area network (WAN)). The above-enumerated types of communication modules 190 may be implemented in a single chip, where at least some of the modules are integrated, or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic device 102 and the electronic device 104 may be a device of the same type as or a different type than the electronic device 101. According to an embodiment, some or all of operations performed by the electronic device 101 may be performed in another electronic device or a plurality of other electronic devices. According to an embodiment, when the electronic device 101 has to perform a function or a service automatically or at a request, the electronic device 101 may request an external electronic device to perform at least some functions associated with the function or the service, instead of or in addition to executing the function or the service. The external electronic device having received the request may execute the requested function or additional function and deliver the execution result to the electronic device 101. The electronic device 101 may then process or further process the received result to provide the requested function or service. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

A term "module" used herein may mean, for example, a unit including one of or a combination of two or more of hardware, software, and firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments as set forth herein may be implemented as software (e.g., the program 140) including one or more instructions that are stored in a non-transitory storage medium (e.g., internal memory 136 or external memory 138) that is readable by a machine (e.g., the electronic device 101). The machine may invoke stored instructions from the storage medium and operate according to the invoked instructions, and may include an electronic device (e.g., the electronic device 101) according to the disclosed embodiments. When the instructions are executed by a processor (for example, the processor 120), the processor may perform functions corresponding to the instructions. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and one or more of the above-described components may be omitted, or one or more other components may be added. Alternatively or additionally, a plurality of components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments may be carried out sequentially, in parallel, repeatedly, or heuristically, or one or more of the operations may be executed in a different order or omitted, or one or more other operations may be added.

Figure 2:
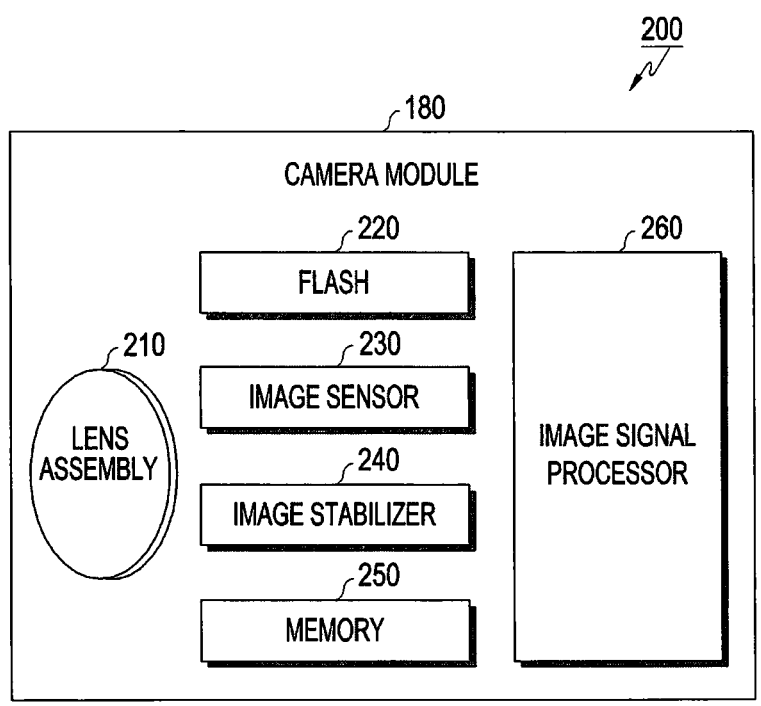
FIG. 2 is a block diagram of a camera module according to various embodiments.

FIG. 2 is a block diagram 200 of the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have at least one lens attribute different from those of another lens assembly. The lens assembly 210 may include, for example, a wide-angle lens or a telephoto lens. The flash 220 may emit light that is used to reinforce light reflected from an object. The flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted from the object and transmitted via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move or control (e.g., adjust read-out timing) at least one lens included in the lens assembly 210 or the image sensor 230 to at least partially compensate for a negative influence (e.g., image blurring) of movement of the camera module 180 or the electronic device 101 including the same upon a captured image in response to the movement. According to an embodiment, the image stabilizer 240 may be implemented with, for example, an optical image stabilizer and may sense such a movement using a gyro sensor (not shown) or an acceleration sensor (not shown) disposed inside or outside the camera module 180.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 160. According to an embodiment, the memory 250 may be configured as at least part of the memory 130 or as a separate memory that is operated independently from the memory 130.

The image signal processor 260 may perform image processing (e.g., depth map generation, three-dimensional (3D) modeling, panorama generation, feature point extraction, image synthesizing, or image compensation (e.g., noise reduction, resolution adjustment, brightness adjustment, blurring, sharpening, or softening) on an image obtained by the image sensor 230 or an image stored in the memory 250. Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing or may be provided to an external component (e.g., the memory 130, the display device 160, the electronic device 102, the electronic device 104, or the server 108) outside the camera module 180. According to an embodiment, the image signal processor 260 may be configured as at least part of the processor 120 or as a separate processor that is operated independently from the processor 120. When the image signal processor 260 is configured as a separate processor, images processed by the image signal processor 260 may be displayed, by the processor 120, via the display device 160 as it is or after being further processed.

According to an embodiment, the electronic device 101 may include two or more camera modules 180 having different attributes or functions. In this case, for example, at least one camera module 180 may be a wide-angle camera or a front camera, and at least one another camera module may be a telescopic camera or a rear camera.

Figure 3:
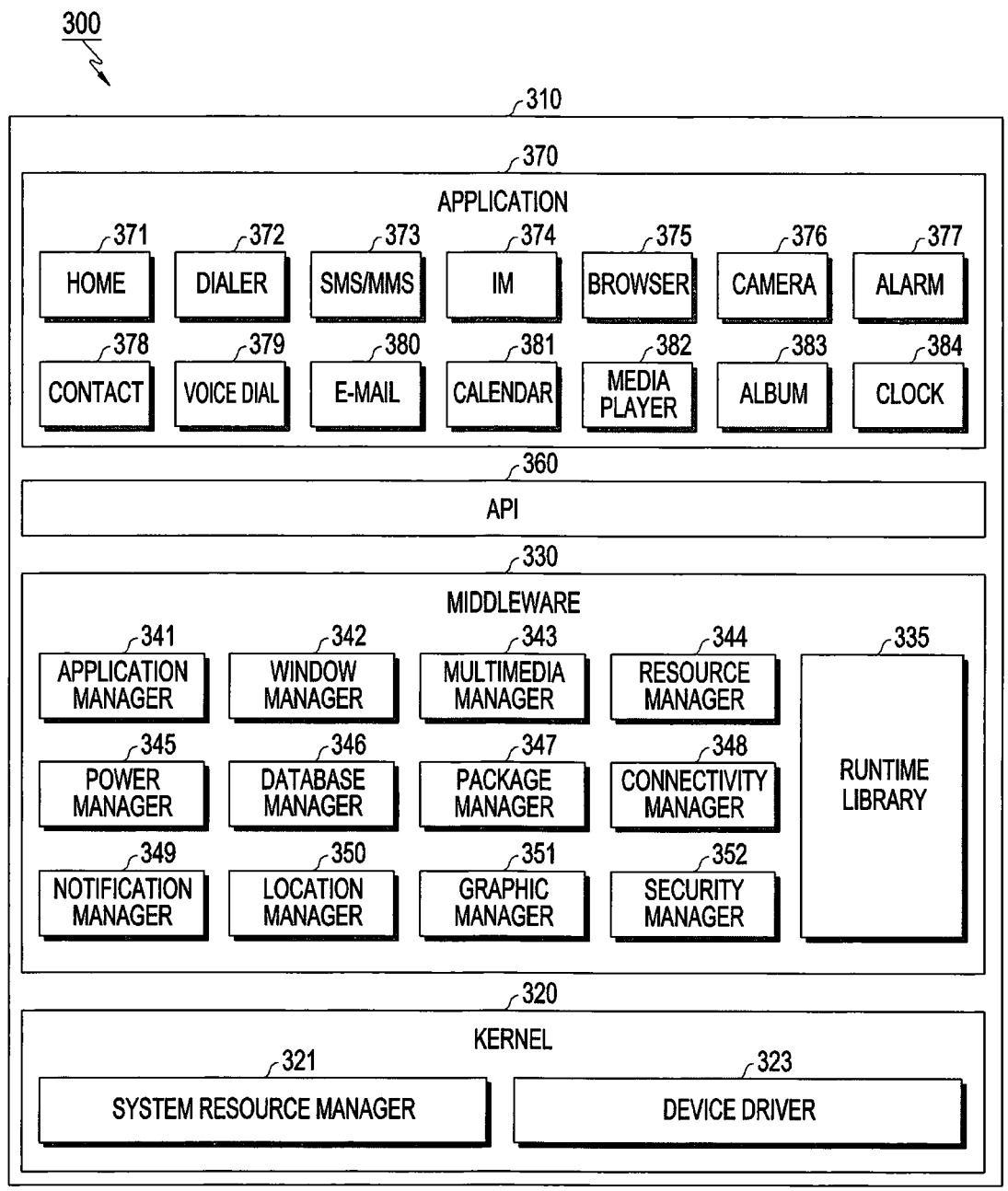
FIG. 3 is a block diagram of a program according to various embodiments.

FIG. 3 is a block diagram 300 of the program 140 according to various embodiments.

According to an embodiment, the program 140 may include an operating system (OS) 142 to control one or more resources of the electronic device 101, middleware 144, or an application 146 executable in the OS 142. The OS may include Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocation or de-allocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 301, a window manager 303, a multimedia manager 305, a resource manager 307, a power manager 309, a database manager 311, a package manager 313, a connectivity manager 315, a notification manager 317, a location manager 319, a graphic manager 321, a security manager 323, a telephony manager 325, or a voice recognition manager 327. The application manager 301 may manage a life cycle of the applications 146. The window manager 303 may manage a graphic user interface (GUI) resource used in a screen. The multimedia manager 305 may recognize a format necessary for playing media files and perform encoding or decoding on a media file by using a codec appropriate for a corresponding format. The resource manager 307 may manage a source code or a memory space of the applications 146. The power manager 309 manages a capacity, a temperature, or power of a battery and determines or provides power information necessary for an operation of the electronic device 101 using corresponding information. According to an embodiment of the present disclosure, the power manager 309 may operate with basic input/output system (BIOS).

The database manager 311 may generate, search or change a database used for at least one application among the applications 146. The package manager 313, for example, may manage installation or update of an application that is distributed in the form of a package file. The connectivity manager 315, for example, may manage a wireless connection or a direct connection between the electronic device 101 and an external electronic device. The notification manager 317, for example, may provide a function to notify a user of an occurring event (e.g., an incoming call, message, or alert). The location manager 319 manages location information of the electronic device 101. The graphic manager 321 may manage, for example, a graphic effect to be provided to a user or a user interface relating thereto. The security manager 323 may provide, for example, system security or user authentication. The telephony manager 325, for example, may manage a voice call function or a video call function provided by the electronic device 101. The voice recognition manager 327, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 344 may dynamically delete some existing components or add new components. According to an embodiment, at least part of the middleware 144 may be included as part of the OS 142 or may be implemented as another software separate from the OS 142.

The application 146 may include one or more applications capable of providing a function, for example, a home application 351, a dialer application 353, a short messaging service/multimedia messaging service (SMS/MMS) application 355, an instant message (IM) application 357, a browser application 359, a camera application 361, an alarm application 363, a contact application 365, a voice recognition application 367, an e-mail application 369, a calendar application 371, a media player application 373, an album application 375, a watch application 377, a health application 379 (e.g., an application for measuring an exercise amount, a blood sugar, etc.), or an environment information application 381 (e.g., an application for providing air pressure, humidity, or temperature information or the like). According to an embodiment, the application 146 may further include an information exchanging application (not shown) that is capable of supporting information exchange between the electronic device 101 and the external electronic device. The information exchange application may include, for example, a notification relay application for transferring specific information (e.g., a call, a message, or an alarm) to the external electronic device or a device management application for managing the external electronic device. The notification relay application delivers notification information corresponding to an event (e.g., e-mail reception) occurring on another application of the electronic device 101 (e.g., the e-mail application 369) to an external electronic device, or receives notification information from an external electronic device and provides the received notification information to the user of the electronic device 101. The device management application may control the power (e.g., turn-on or turn-off) or the function (e.g., adjustment of brightness, resolution, or focus) of the external electronic device communicating with the electronic device 101 or some component thereof (e.g., the display device 160 or the camera module 180). The device management application, additionally or alternatively, may support installation, delete, or update of an application running on the external electronic device.

Figure 4:
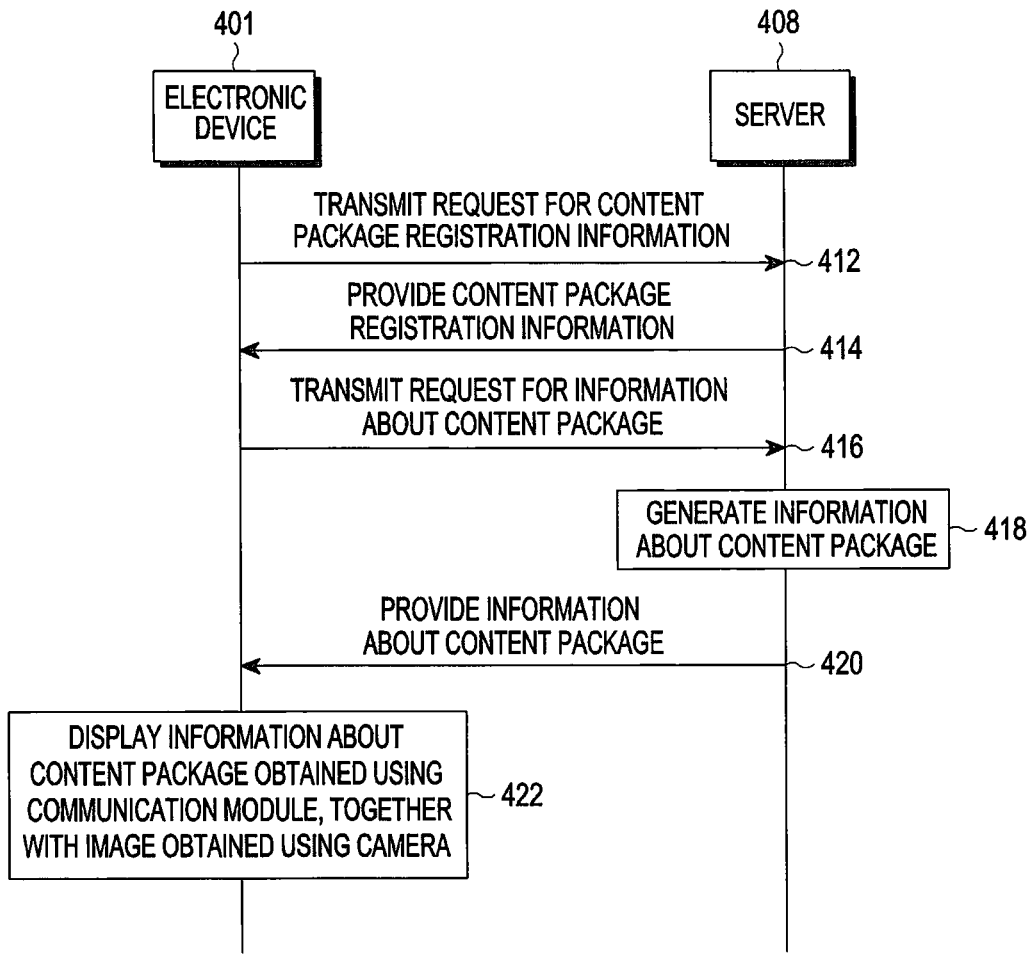
FIG. 4 is a flowchart illustrating operations of an electronic device and a server, according to various embodiments.

FIG. 4 is a flowchart illustrating operations of an electronic device and a server, according to various embodiments.

Referring to FIG. 4, an electronic device 401 (e.g., the electronic device 101 of FIG. 1) may transmit a request for content package registration information to an external device, a server 408 (e.g., the server 108 of FIG. 1) by using a communication module (e.g., the communication module 190 of FIG. 1), in operation 412. According to various embodiments, upon execution of an application (or function), the electronic device 401 may transmit a request for content package registration information associated with the executed application (or function) to the server 408. According to various embodiments, upon execution of a camera application (or camera function), the electronic device 401 may transmit a request for content package registration information associated with the executed camera application (or camera function) to the server 408. According to various embodiments, the content package may include a plurality of contents. According to various embodiments, each of the plurality of contents may include at least one graphics object, and may include data allowing display of a graphics image using the at least one graphics object.

The server 408 may provide the content package registration information, in operation 414. According to various embodiments, the server 408 may register the content package including the plurality of contents provided from a content provider, and provide information about the registered content package as the content package registration information. According to an embodiment, information about the registered content package may include a registered content package list. According to various embodiments, the information about the registered content package may further include information about whether the registered content package is registered previously or newly or information whether the registered content package is downloadable for free or through purchase.

The electronic device 401 may transmit a request for information about the content package (hereinbelow, 'content package information') to the server 408 in operation 416, upon receiving the content package registration information from the server 408. According to various embodiments, the electronic device 401 may transmit a request for information about at least a part of the registered content package to the server 408. According to an embodiment, the electronic device 401 may compare the registered content package list received from the server 408 with the content package stored in a memory (e.g., the memory 130 of FIG. 1) inside the electronic device 401 to identify a newly registered content package (hereinafter, a 'new content package') and transmit a request for information about the new content package to the server 408. According to various embodiments, while displaying the image obtained using the camera module, the electronic device 401 may transmit a request for content package information to the server 408 in response to an input made through a first icon (or a first key) displayed on the display.

The server 408 may generate the content package information in response to the request, in operation 418. According to various embodiments, in response to a request for content package information (e.g., a request for new content package information) from the electronic device 401, the server 408 may generate content package information including a plurality of images respectively corresponding to a plurality of contents included in a content package and data regarding some of the plurality of contents. According to an embodiment, each of the plurality of images may include an image indicating a representative graphic object corresponding to each of the plurality of contents or an image including a representative icon indicating each of the plurality of contents. According to an embodiment, some of a plurality of contents may include contents (e.g., for demonstration) available before purchase among the plurality of contents.

According to various embodiments, each of the plurality of contents may include at least one graphics object and may include data allowing display of a graphics image using the at least one graphics object. For example, the plurality of contents may include a plurality of contents associated with a camera module (or a camera application (or function)), in which each content may be sticker image content that may express a graphic image using at least one graphic object in a region corresponding to a designated object included in an image obtained from the camera when the obtained image is displayed. According to various embodiments, each content may include a plurality of graphic objects and may include data enabling expression of a graphic image using at least one of a plurality of graphic objects in a region corresponding to a designated object included in a person image obtained from the camera, e.g., any one or two or more objects among a head, a face, an ear, an eye, a nose, or a mouth when the person image is displayed. According to various embodiments, the content package may have various themes such as a hat, an animal, a heart, etc., in which each content package may include a plurality of contents associated with the theme. For example, the hat content package may include a plurality of contents associated with the hat, such as a baseball cap, a straw hat, or a wizard hat, and an animal package may include a plurality of contents associated with an animal such as a bear, a rabbit, a lion, or a cat.

According to various embodiments, each of the plurality of contents may include data enabling expression of a graphic image using at least one graphic object in a region corresponding to a designated object included in an image obtained from the camera in a state where at least one graphic object and the obtained image are displayed. According to various embodiments, baseball cap content may include data enabling expression of a graphic image using at least one graphic object indicating a baseball cap in a region corresponding to a designated object included in an image obtained from the camera in a state where the at least one graphic object indicating the baseball cap and the obtained image are displayed.

The server 408 may transmit the generated content package information to the electronic device 401 in operation 420. The content package information transmitted from the server 408 may be received by the electronic device 401 and stored in a memory (e.g., the memory 130 of FIG. 1).

In operation 422, when displaying an image obtained using a camera (e.g., the camera module 180 of FIG. 1 or the camera module 200 of FIG. 2), the electronic device 401 may display on a display, at least some of the plurality of images respectively corresponding to the plurality of contents of the content package information, together with the obtained image. According to various embodiments, the electronic device 401 may display the obtained image on a preview screen corresponding to execution of a camera application (or a camera function) and display at least some of the plurality of images respectively corresponding to the plurality of contents based on the content package information in a designated region while displaying the obtained image. According to various embodiments, the electronic device 401 may display at least some of the plurality of images respectively corresponding to the plurality of contents in a designated region of the display, upon execution of the camera application, upon execution of the camera application and execution of a selfie mode, or upon execution of the camera application and input of a user input such as key selection.

According to an embodiment, the plurality of images respectively corresponding to the plurality of contents may include representative graphic objects or representative icons respectively corresponding to the plurality of contents. According to an embodiment, the electronic device 401 may display a first image corresponding to some content available before a purchase thereof (e.g., for demonstration) and a second image corresponding to the other contents unavailable before a purchase thereof among the plurality of images distinguishably from each other. For example, the electronic device 401 may display the first image corresponding to some contents available before a purchase thereof in an original color and a second image corresponding to the other contents unavailable before a purchase thereof in a grayscale color. According to various embodiments, the first image is intended for demonstration, such that a first graphic image corresponding to the first image be displayed in a region corresponding to a designated object included in an image obtained by the camera and a second graphic image corresponding to the second image may not be displayed in the region corresponding to the designated object included in the image obtained by the camera.

Figure 5:
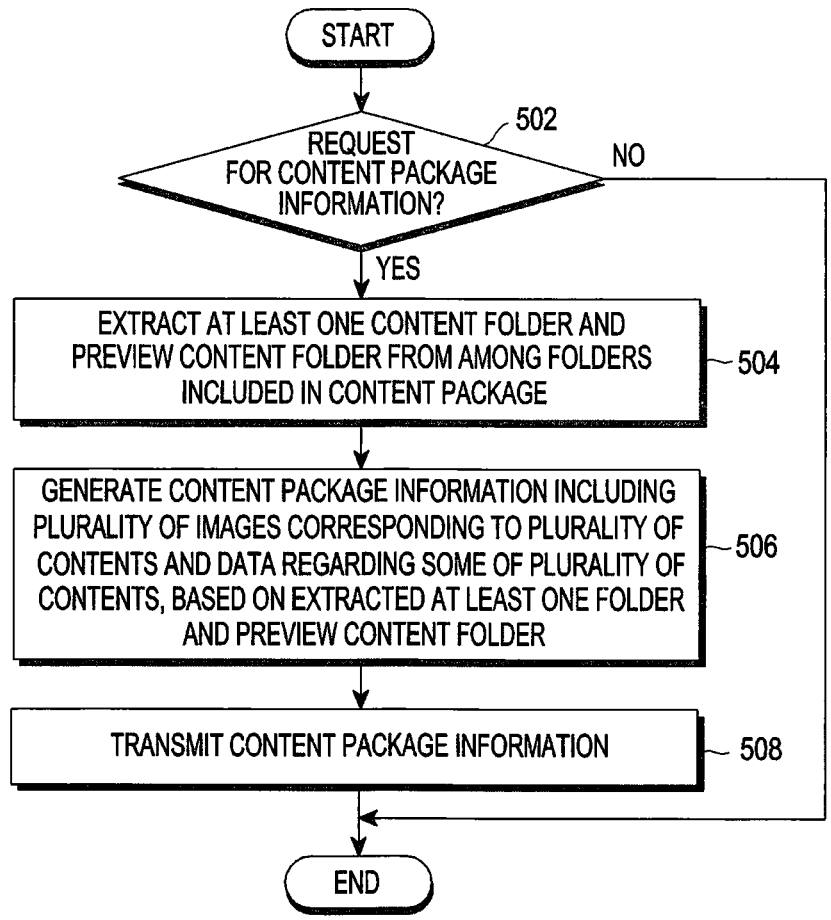
FIG. 5 is a flowchart illustrating operations of a server, according to various embodiments.

FIG. 5 is a flowchart illustrating operations of a server, according to various embodiments.

Referring to FIG. 5, the server 408 may receive a request for content package information from the electronic device 401, in operation 502. According to various embodiments, the content package may be generated by a content provider and registered in the server 408 and may be stored and managed in a memory or a database of the server 408. The server 408 may identify the content package requested from the electronic device 401 from among a plurality of content packages stored and managed. According to various embodiments, each of the content packages may have a form of a package folder including a plurality of contents, and the package folder may include a plurality of content folders and a plurality of preview content folders, which respectively correspond to the plurality of contents. According to an embodiment, each of the plurality of content folders may include a plurality of graphic objects respectively corresponding to the plurality of contents and data enabling expression of a graphic image by using the plurality of graphic objects. Each of the plurality of preview content folders may include information for preview of each of the plurality of contents included in the content package. For example, the plurality of preview content folders may include representative images of the plurality of contents respectively corresponding to the plurality of content folders (or reduced images of the representative images or icons respectively corresponding to the representative images) and data including information for performing an operation corresponding to all the contents (e.g., an information file).

The server 408 may extract some content folders and a preview folder from folders included in a content package corresponding to the requested content package information, in operation 504. According to various embodiments, the server 408 may extract at least some content folders and a preview folder designated to be provided for demonstration from the plurality of content folders.

The server 408 may generate content package information, which includes a plurality of images corresponding to a plurality of contents based on the extracted at least some content folders and a preview folder and data regarding some of the plurality of contents, in operation 506 and transmit the generated content package information to the electronic device 401 in operation 508.

According to various embodiments, an electronic device (e.g., 101 of FIG. 1, 401 of FIG. 4, or 501 of FIG. 5) may include a display (e.g., the display device 160 of FIG. 1), a camera module (e.g., the camera module 180 of FIG. 1), a communication module (e.g., the communication module 190 of FIG. 1), and a processor (e.g., the processor 120 of FIG. 1), in which the processor may be configured to obtain a plurality of images corresponding to a plurality of contents and data regarding at least part of the plurality of contents from an external device, by using the communication module, to display an image obtained using the camera module through the display, to display at least part of the plurality of images in a designated region of the display while displaying the image obtained using the camera module, and to display a graphic image in a region corresponding to a designated object included in the image obtained using the camera module, by using the data, upon obtaining an input related to a first image from among the at least part of the plurality of images.

According to various embodiments, the data may include a plurality of graphic objects to be displayed in the region corresponding to the designated object.

According to various embodiments, the processor may be configured to obtain data regarding the plurality of contents from the external device, at least based on the received input.

According to various embodiments, the processor may be configured to display an interface for downloading data regarding other content than the at least part of the plurality of contents when obtaining an input related to a second image corresponding to the other content from among the at least part of the plurality of images displayed in the designated region of the display.

According to various embodiments, the processor may be configured to display the first image and the second image using different display schemes.

According to various embodiments, the processor may be configured to display the first image in an original color and the second image in a gray-scale-processed color.

According to various embodiments, a first graphic object corresponding to the first image may be displayable in the region corresponding to the designated object included in the image obtained using the camera module, and a second graphic object corresponding to the second image may not be displayable in the region corresponding to the designated object included in the image.

According to various embodiments, the processor may be configured to obtain a plurality of images corresponding to a plurality of contents and data regarding at least part of the plurality of contents from the external device, upon activation of the camera module through execution of a first application.

According to various embodiments, the electronic device may further include a memory electrically connected with the processor, in which the memory may store a plurality of images corresponding to the obtained plurality of contents and the data regarding at least part of the plurality of contents.

According to various embodiments, the processor may be configured to display at least part of the plurality of images in a first region of the display, and a representative image indicating a content package including the plurality of images in a second region of the display, while displaying the image obtained using the camera module.

According to various embodiments, the processor may be configured to obtain the plurality of images corresponding to the plurality of contents and the data regarding at least part of the plurality of contents in response to an input made through a first icon displayed on the display, while displaying the image obtained using the camera module.

According to various embodiments, the plurality of contents may be included in an Android application package file.

Figure 6:
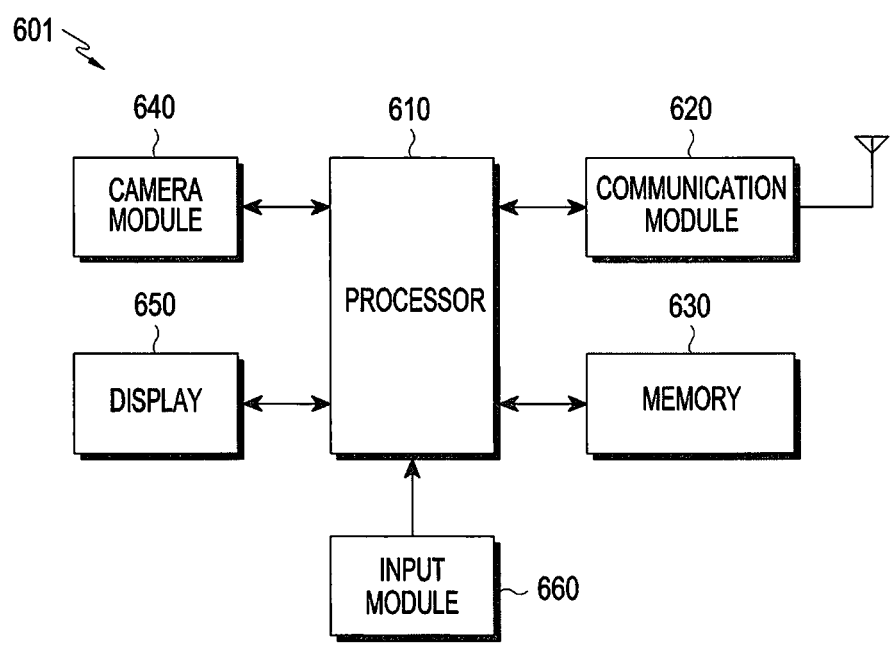
FIG. 6 is a block diagram of an electronic device, according to various embodiments.

FIG. 6 is a block diagram of an electronic device, according to various embodiments.

Referring to FIG. 6, an electronic device 601 according to an embodiment may include the entire electronic device 101 of FIG. 1 or a part thereof or the entire electronic device 401 of FIG. 4 or a part thereof and may include a processor 610, a communication module 620, a memory 630, a camera module 640, a display 650, and an input module 660.

The processor 610 (e.g., the processor 120) may control overall operations of the electronic device 601. The processor 610 may include one or more of a central processing unit (CPU), an application processor (AP), and a communication processor (CP). The processor 610 performs operations or data processing for control and/or communication of, for example, at least one other elements of the electronic device 601.

According to various embodiments, the processor 610 may receive content package information including a plurality of images corresponding to a plurality of contents included in a content package and data regarding some of the plurality of contents from a server (e.g., 108 of FIG. 1 or 408 of FIG. 4) through the communication module 620.

According to various embodiments, when the camera module 640 is activated or a first application such as a camera application or a camera-related application is executed and thus the camera module 640 is activated, the electronic device 601 may obtain the plurality of images corresponding to the plurality of contents and the data regarding some of the plurality of contents. While displaying the image obtained using the camera module 640, the electronic device 601 may obtain the plurality of images corresponding to the plurality of contents and the data regarding some of the plurality of contents in response to an input made through a first icon (or a first key) displayed on the display 650.

According to various embodiments, each of the plurality of contents may include at least one graphics object and may include data allowing display of a graphics image using the at least one graphics object. According to an embodiment, each content may include content enabling expression of a graphic image by using at least one graphic object in a region corresponding to a designated object included in the image obtained from the camera in a state where the obtained image is displayed. For example, each content may include sticker image content enabling expression of a graphic image using at least one of a plurality of graphic objects in a region corresponding to a designated object included in a person image obtained from the camera, e.g., any one or two or more objects among a head, a face, an ear, an eye, a nose, or a mouth when the person image is displayed.

According to various embodiments, each content may include data enabling expression of a graphic image using at least one graphic object in a region corresponding to a designated object included in an image obtained from the camera in a state where at least one graphic object and the obtained image are displayed. According to various embodiments, baseball cap content may include data enabling expression of a graphic image using at least one graphic object indicating a baseball cap in a region corresponding to a designated object included in an image obtained from the camera in a state where the at least one graphic object indicating the baseball cap and the obtained image are displayed.

For example, at least one graphic object expressing a baseball cap may include a front baseball cap graphic object or a side baseball cap graphic object. In another embodiment, the baseball cap content may further include not only a graphic object indicating a baseball cap, but also a graphic object related to the baseball cap, e.g., a front mustache graphic object and a side mustache graphic object that are a set with the baseball cap.

The data enabling expression of the graphic image by using at least one graphic object according to various embodiments may include information related to rules regarding when and where to locate at least one of the plurality of graphic objects. For example, when a designated object (e.g., a person's face) of the image obtained through the camera module 640 is a side, the electronic device 601 may display, at least based on the data, a graphic image that applies the side baseball cap graphic object to a head of the designated object by using the display 650. In another example, when the designated object of the image obtained through the camera module 640 is a front, the electronic device 601 may display, at least based on the data, a graphic image that applies the front baseball cap graphic object to a head of the designated object by using the display 650.

The processor 610 may cause the image obtained using the camera module 640 to be displayed through the display 650, and while displaying the image obtained using the camera module 640, may cause the at least some of a plurality of images corresponding to a plurality of contents received through the communication module 620 to be displayed in a designated region of the display 650. According to various embodiments, while displaying the image, the processor 610 may display at least some of a plurality of images corresponding to the plurality of contents in a first region of the display and a representative image indicating a content package including the plurality of contents in a second region of the display. According to an embodiment, each of the plurality of images may include an image indicating a representative graphic object corresponding to each of the plurality of contents or a representative icon image indicating each of the plurality of contents.

For example, the processor 610 may display the image obtained using the camera module 640 on a preview screen corresponding to execution of a camera application (or a camera function), and display at least some of the plurality of images respectively corresponding to the plurality of contents based on the content package information in a designated region while displaying the obtained image. According to various embodiments, the processor 610 may display at least some of the plurality of images respectively corresponding to the plurality of contents in a designated region of the display 650, upon execution of the camera application, upon execution of the camera application and execution of a selfie mode, or upon execution of the camera application and input of a user input such as key selection.

According to an embodiment, the processor 610 may display a first image corresponding to some content available before a purchase thereof (e.g., for demonstration) and a second image corresponding to the other contents unavailable before a purchase thereof among the plurality of images distinguishably from each other. For example, the processor 610 may display the first image corresponding to some contents available before a purchase thereof in an original color and a second image corresponding to the other contents unavailable before a purchase thereof in a gray-scale color. According to various embodiments, the first image is intended for demonstration, such that a first graphic object corresponding to the first image be displayed in a region corresponding to a designated object included in an image obtained by the camera, and a second graphic object corresponding to the second image may not be displayed in the region corresponding to the designated object included in the image obtained by the camera.

Upon receiving an input related to the first image corresponding to the some contents for demonstration among the plurality of images displayed in the designated region, the processor 610 may display a graphic image in a region corresponding to a designated object included in the image obtained by the camera module 640 in a display region by using data corresponding to the some contents. For example, upon receiving a user input for selecting the first graphic image corresponding to the some contents for demonstration through the input module 660, the processor 610 may display the first graphic object and a first graphic image using an image of a designated object region in the region corresponding to the designated object included in the image in the display region by using data corresponding to the some contents. According to various embodiments, upon receiving a user input for selecting a first image corresponding to some contents for demonstration in a state where a person image obtained from the camera is displayed, the processor 610 may display a graphic image by using at least one first graphic object corresponding to the first image and the image of the designated object, in a region corresponding to the designated object included in the image, e.g., any one or two or more objects among a head, a face, an ear, an eye, a nose, or a mouth by using the data corresponding to the some contents. For example, upon receiving a user input for selecting a rabbit image from among a plurality of images corresponding to animal contents for demonstration in a state where the person image obtained from the camera is displayed, the processor 610 may display a graphic image by using at least one rabbit graphic object corresponding to the rabbit image and an image of any one or two or more objects among a head, a face, an ear, an eye, a noise or a mouth, in a region corresponding to the designated object included in the image, e.g., any one or two or more objects among the head, the face, the ear, the eye, the nose, or the mouth by using data corresponding to the rabbit image.

Upon receiving an input related to a second image corresponding to other contents than some contents for demonstration (e.g., contents available after downloading of a content package) among the plurality of images displayed in the designated region, the processor 610 may display on the display 650 an interface through which data regarding the plurality of contents is downloadable. The processor 610 may obtain the data regarding the plurality of contents from an external device by using the communication module 620 through the interface.

The memory 620 (e.g., the memory 130 of FIG. 1) may include a volatile and/or nonvolatile memory. The memory 620 may store, for example, commands or data associated with at least one other elements of the electronic device 601. According to an embodiment, the memory 620 may store software and/or a program (e.g., an application program). According to an embodiment, the memory 620 may store instructions for performing operations executed by the processor 620. According to an embodiment, the memory 620 may store received content package information including a plurality of images corresponding to a plurality of contents and data regarding some of the plurality of contents. For example, the memory 620 may store content package information using the camera, e.g., a plurality of images corresponding to a plurality of contents included in a content package and data regarding some of a plurality of graphic contents in a memory region used in execution of the camera application.

The communication module 630 (e.g., 190 of FIG. 1) may establish a wired or wireless communication channel with at least one external device and perform communication through the established communication channel. According to various embodiments, the communication module 630 may transmit a signal (e.g., a query signal) for requesting content package registration information to a server (e.g., 108 of FIG. 1 or 408 of FIG. 4) and receive the content package registration information in response to the signal from the server. According to various embodiments, the communication module 830 may transmit a signal for requesting information about a content package to the server, and receive content package information including a plurality of images respectively corresponding to a plurality of contents included in the content package and data regarding some of the plurality of contents from the server.

The camera module 640 (e.g., 180 of FIG. 1 or 200 of FIG. 2) may obtain a subject image through one or more lenses, an image sensor, or an image signal processor. According to various embodiments, the camera module 640 may obtain and provide an image of a subject in a preview mode, upon execution of the camera application. In the preview mode, the camera module 640 may capture a still image or a moving image in response to a request for capturing a still image or a moving image.

The display 650 (e.g., the display 160 of FIG. 1) may display various display information generated in the electronic device 601. According to various embodiments, under control of the processor 610, the display 650 may display an image obtained by the camera module 640, and display a plurality of images indicating a plurality of contents included in content package information in a designated region of the display 650 while displaying the image obtained by the camera module 640. According to an embodiment, under control of the processor 610, the display 650 may display a preview screen corresponding to execution of the camera application, display the image obtained using the camera module 640 on the preview screen, and display a plurality of images respectively corresponding to a plurality of contents expressing the image obtained using the camera module 640 in a designated region of the display 650. According to various embodiments, the display 650 may display the plurality of images respectively corresponding to the plurality of contents in a designated region of the display 650, under control of the processor 610, upon execution of the camera application, upon execution of the camera application and execution of a selfie mode, or upon execution of the camera application and input of a user input such as key selection.

According to an embodiment, under control of the processor 610, the display 650 may display a first image corresponding to some content available before a purchase thereof (e.g., for demonstration) and a second image corresponding to the other contents unavailable before a purchase thereof among the plurality of images distinguishably from each other. According to an embodiment, the display 650 may display at least some of the plurality of images in a first region of the display and a representative image (or icon) indicating a content package including the plurality of contents in a second region of the display, while displaying the image obtained using the camera module 640, under control of the processor 610.

The input module 660 (e.g., the input device 150 of FIG. 1) may include, as a device for receiving a command or data to be used in a component (e.g., the processor 120) of the electronic device 601 from the outside (e.g., a user) of the electronic device 601, e.g., a microphone, a mouse, a keyboard, or a touch-based input device (e.g., a touch pen).

According to various embodiments, a method for providing contents associated with a camera function in an electronic device (e.g., 101 of FIG. 1, 401 of FIG. 4, or 601 of FIG. 6) may include obtaining a plurality of images corresponding to a plurality of contents and data regarding at least part of the plurality of contents from an external device (e.g., the server 108 of FIG. 1 or the server 408 of FIG. 4), displaying an image obtained using a camera module through a display of the electronic device, displaying at least part of the plurality of images in a designated region of the display while displaying the image obtained using the camera module, and displaying a graphic image in a region corresponding to a designated object included in the image obtained using the camera module, by using the data, upon obtaining an input related to a first image from among the at least part of the plurality of images.

According to various embodiments, the data may include a plurality of graphic objects to be displayed in the region corresponding to the designated object.

According to various embodiments, the method may further include obtaining data regarding the plurality of contents from the external device, at least based on the received input.

According to various embodiments, the first image and the second image may be displayed using different display schemes.

According to various embodiments, the method may further include obtaining a plurality of images corresponding to a plurality of contents and data regarding at least part of the plurality of contents from the external device, upon activation of the camera module through execution of a first application.

According to various embodiments, the method may further include displaying at least part of the plurality of images in a first region of the display, and a representative image indicating a content package including the plurality of images in a second region of the display, while displaying the image obtained using the camera module.

According to various embodiments, the method may further include obtaining the plurality of images corresponding to the plurality of contents and the data regarding at least part of the plurality of contents from the external electronic device in response to an input made through a first icon displayed on the display, while displaying the image obtained using the camera module, and displaying the data through the display.

Figure 7:
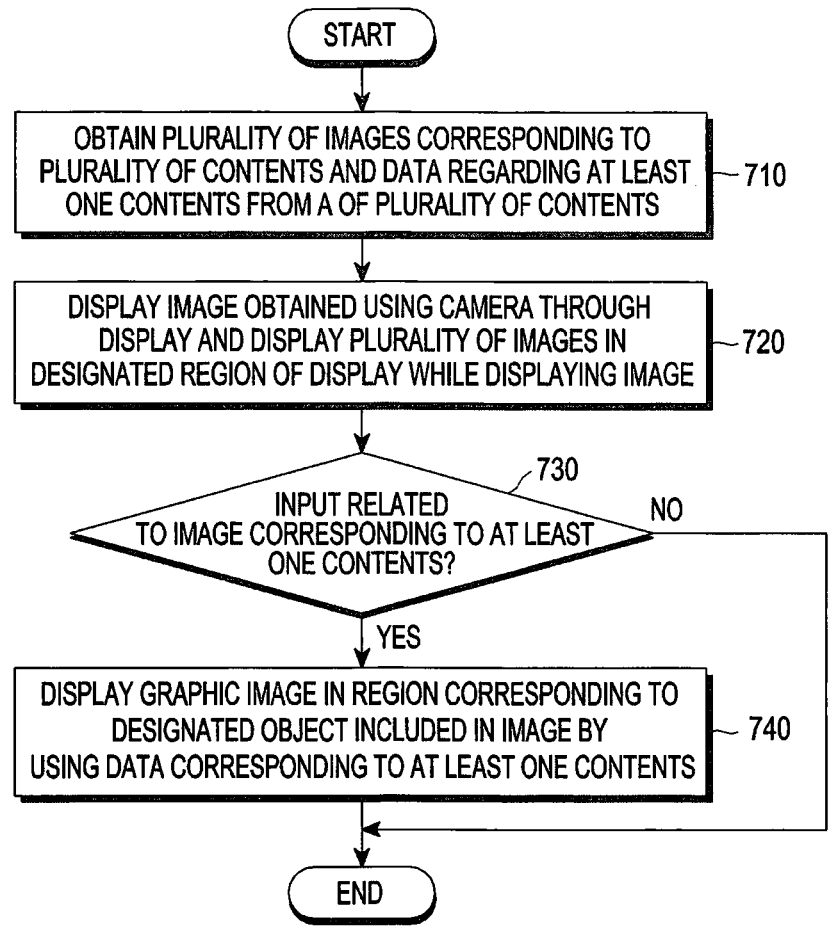
FIG. 7 is a flowchart illustrating a method for providing contents associated with a camera function, according to various embodiments.

FIG. 7 is a flowchart illustrating a method for providing contents associated with a camera function, according to various embodiments.

Referring to FIG. 7, an electronic device (e.g., the electronic device 101 of FIG. 1, the electronic device 401 of FIG. 4, the electronic device 501 of FIG. 5, or the processor 610 of the electronic device 601 of FIG. 6 (e.g., the processor 120 of FIG. 1) may obtain a plurality of images corresponding to a plurality of contents included in a content package and data regarding some of the plurality of contents, in operation 710.

According to various embodiments, when the camera module 640 is activated or a first application such as a camera application or a camera-related application is executed and thus the camera module 640 is activated, the processor 610 may obtain the plurality of images corresponding to the plurality of contents and the data regarding some of the plurality of contents. While displaying the image obtained using the camera module 640, the processor 610 may obtain the plurality of images corresponding to the plurality of contents and the data regarding some of the plurality of contents in response to an input made through a first icon (or a first key) displayed on the display 650.

According to an embodiment, the processor 610 may receive and obtain content package information including a plurality of images corresponding to a plurality of contents included in a content package and data regarding some of the plurality of contents from an external device, e.g., a server (e.g., 408 of FIG. 4) through the communication module 620.

According to various embodiments, each of the plurality of contents may include at least one graphics object, and may include data allowing display of a graphics image using the at least one graphics object. For example, content may include content enabling expression of a graphic image by using at least one graphic object in a region corresponding to a designated object included in the image obtained using a camera module (e.g., the camera module 640 of FIG. 6) in a state where the obtained image is displayed. For example, content may include sticker image content enabling expression of a graphic image using at least one of a plurality of graphic objects in a region corresponding to a designated object included in a person image obtained from the camera module 640, e.g., any one or two or more objects among a head, a face, an ear, an eye, a nose, or a mouth when the person image is displayed.

According to an embodiment, the content package may have various themes such as a hat, an animal, a heart, etc., and the plurality of contents included in the content package may include a plurality of contents associated with the hat, a plurality of contents associated with the animal, or a plurality of contents associated with the heart. For example, the plurality of contents associated with the hat may include contents associated with various hats such as baseball cap content, straw hat content, wizard hat content, etc., and the plurality of contents associated with the animal may include contents associated with the animal such as bear content, rabbit content, lion content, cat content, etc.

According to various embodiments, each content may include data enabling expression of a graphic image using at least one graphic object in a region corresponding to a designated object included in an image obtained from the camera in a state where at least one graphic object and the obtained image are displayed. According to various embodiments, baseball cap content may include data enabling expression of a graphic image using at least one graphic object indicating a baseball cap in a region corresponding to a designated object included in an image obtained from the camera in a state where the at least one graphic object indicating the baseball cap and the obtained image are displayed.

For example, at least one graphic object expressing a baseball cap may include a front baseball cap graphic object or a side baseball cap graphic object. In another embodiment, the baseball cap content may further include not only a graphic object indicating a baseball cap, but also a graphic object related to the baseball cap, e.g., a front mustache graphic object and a side mustache graphic object that are a set with the baseball cap.

The data enabling expression of the graphic image by using at least one graphic object according to various embodiments may include rules regarding when and where to locate at least one graphic object. For example, when a designated object (e.g., a person's face) of the image obtained through the camera module 640 is a side, the electronic device 601 may display, at least based on the data, a graphic image that applies the side baseball cap graphic object to a head of the designated object by using the display 650. In another example, when the designated object of the image obtained through the camera module 640 is a front, the electronic device 601 may display, at least based on the data, a graphic image that applies the front baseball cap graphic object to a head of the designated object by using the display 650. According to an embodiment, the data enabling expression of a graphic image by using the at least one graphic object may be included in a "JSON" file.

In operation 720, the processor 610 may cause the image obtained using the camera module 640 to be displayed through the display 650, and while displaying the image obtained using the camera module 640, may cause the at least some of a plurality of images corresponding to a plurality of contents to be displayed in a designated region of the display 650. According to various embodiments, while displaying the image obtained using the camera module 640, the processor 610 may display at least some of a plurality of images respectively corresponding to the plurality of contents in a first region of the display and a representative image indicating a content package including the plurality of contents in a second region of the display.

For example, the processor 610 may display the image obtained using the camera module 640 on a preview screen corresponding to execution of a camera application (or a camera function) and display at least some of the plurality of images respectively corresponding to the plurality of contents based on the content package information in a designated region while displaying the image obtained using the camera module 640. According to various embodiments, the processor 610 may display the plurality of images respectively corresponding to the plurality of contents in a designated region of the display, upon execution of the camera application, upon execution of the camera application and execution of a selfie mode, or upon execution of the camera application and input of a user input such as key selection.

According to an embodiment, the processor 610 may display a first image corresponding to some content available before a purchase thereof (e.g., for demonstration) and a second image corresponding to the other contents unavailable before a purchase thereof among the plurality of images distinguishably from each other. For example, the processor 610 may display the first image corresponding to some contents available before a purchase thereof in an original color and a second image corresponding to the other contents unavailable before a purchase thereof in a gray-scale color.

In operation 730, the processor 610 may determine whether an input related to an image corresponding to the some contents is received. According to various embodiments, the processor 610 may determine whether an input for selecting the first image corresponding to some contents for demonstration among a plurality of images displayed in a designated region of the display 650 is received through the input module 660.

Upon receiving the input for selecting the image corresponding to the some contents, the processor 610 may display the graphic image by using the at least one first graphic object corresponding to the first image in the region corresponding to the designated object included in the image in the display region by using the data corresponding to the some contents, in operation 740. According to various embodiments, upon receiving an input for selecting a first image corresponding to some contents for demonstration in a state where a preview screen including a person image obtained using the camera module 640 is displayed, the processor 610 may display a graphic image by using at least one first graphic object corresponding to the first image, in a region corresponding to the designated object included in the image, e.g., any one or two or more objects among a head, a face, an ear, an eye, a nose, or a mouth by using the data corresponding to the some contents. For example, upon receiving a user input for selecting a rabbit image that is a first image corresponding to rabbit contents for demonstration in a state where a preview screen including a person image is displayed, the processor 610 may display a graphic image by using at least one rabbit graphic object among a plurality of rabbit graphic objects corresponding to a first rabbit image, in a region corresponding to the designated object included in the image, e.g., any one or two or more objects among a head, a face, an ear, an eye, a nose, or a mouth by using the data corresponding to the rabbit contents.

According to various embodiments, upon receiving an input related to a second image corresponding to other contents than some contents for demonstration (e.g., contents available after downloading of a content package) among the plurality of images displayed in the designated region, the processor 610 may display on the display 650, an interface through which data regarding the plurality of contents is downloadable. The processor 610 may obtain the data regarding the plurality of contents from an external device by using the communication module 620 through the interface.

Figure 8:
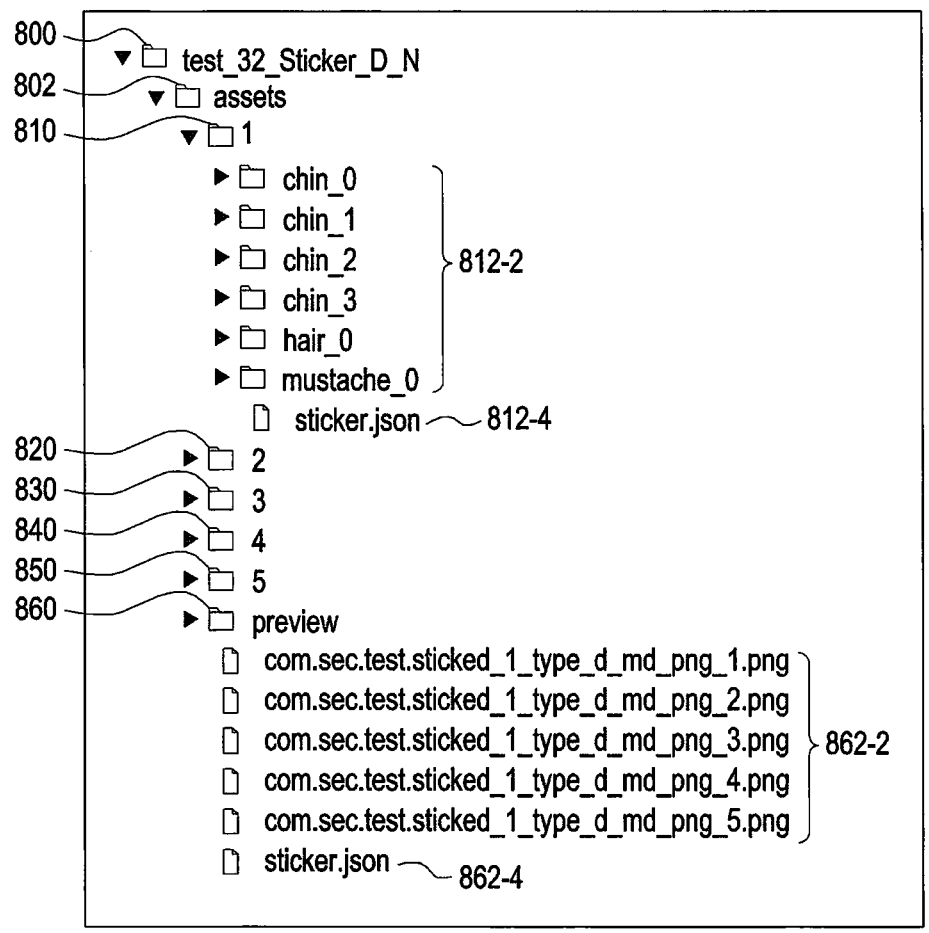
FIG. 8 is a diagram for describing a content package according to various embodiments.

FIG. 8 is a diagram for describing a content package according to various embodiments.

Referring to FIG. 8, a content package 800 may be generated by a content provider, and a content authoring tool for generation may be used. According to an embodiment, the content package 800 may be generated based on an Android application package.

According to various embodiments, the content package 800 may be registered in a content providing server (e.g., 108 of FIG. 1 or 408 of FIG. 4) and may be provided from the server to an electronic device (e.g., 101 of FIG. 1, 401 of FIG. 4, or 601 of FIG. 6).

According to various embodiments, the content package 800 may include a package folder 802 including a plurality of contents. The package folder 802 may include a plurality of content folders 810 through 850 respectively corresponding to the plurality of contents and a preview content folder 860.

According to an embodiment, each of the plurality of content folders, e.g., first through fifth content folders 810 through 850 may include a plurality of graphic objects respectively corresponding to the first through fifth contents and data enabling expression of a graphic image by using the plurality of graphic objects. For example, the first content folder 810 may include graphic object folders 812-2 including a plurality of graphic objects and data 812-4 enabling expression of a graphic image by using at least some of a plurality of graphic objects included in each of the graphic object folders 812-2. According to various embodiments, the first graphic folder 810 may include the plurality of graphic object folders 812-2 related to a face and the data 812-4 enabling expression of a graphic image corresponding to a face object by using at least some of the plurality of graphic objects. For example, among the graphic object folders 812-2, chin_0 through chin_3 may include a graphic object related to a chin, hair_0 may include a graphic object related to a head, and mustache_0 may include a graphic object related to a mustache. According to various embodiments, the data 812-4 may include an information file for describing information for expressing a graphic image by using at least some of the plurality of graphic objects included in each of the graphic object folders 812-2. For example, the information file may be a "JSON" file, and may include various information enabling expression of a graphic image by using at least some of a plurality of graphic objects based on an event. For example, when an eye blink event in the image obtained by the camera occurs, the data 812-4 (hereinafter, referred to as the 'information file') may include information enabling expression of the graphic image in the image by using the graphic object included in chin_0. According to various embodiments, each of the second through fifth content folders 820 through 850, like the first content folder 810, may include an information file enabling expression of a graphic image by using graphic object folders including a plurality of graphic objects and at least some of a plurality of graphic objects included in each of the graphic object folders.

The preview content folder 860 may include information for preview of each of the plurality of contents included in the content package 800. For example, the preview content folder 860 may include representative images 862-2 of contents respectively corresponding to the first through fifth content folders 810 through 850 (or reduced images of the respective representative images 862-2 or icons respectively corresponding to the representative images 862-2) and an information file 862-4 including information for performing an operation corresponding to the entire contents corresponding to the first through fifth content folders 810 through 850.

According to various embodiments, the information file 862-4 may include sticker_version, tool_version, title, package_name, attribute, sticker_files, representative, tray_on, preview, or original information for an information file of a sticker image content package. The sticker_version information may be sticker image content package version information. The tool_version information may be sticker image content package producing tool version information. The title information may be content package title information. The package_name information may be information indicating a content package name. The attribute information may be type information of each of sticker contents included in the content package. The sticker_files information may be file list information of all sticker image contents included in the sticker image content package. The representative information may be representative image information for each of a plurality of contents included in the content package. The tray_on information may be image information to be displayed in a region on the display screen. The preview information may be a preview image shown on an application purchase or download application screen. The original information may be sticker images included in the sticker image content package. According to various embodiments, the information file may further include information other than the foregoing information.

According to various embodiments, upon receiving a request for information about the content package 800, a server (e.g., 108 of FIG. 1 or 408 of FIG. 4) may extract at least some of the first through fifth content folders 810 through 850 included in the content package 800 and the preview folder 862-2, and generate content package information based on the extracted at least some content folder and preview folder 862-2. According to various embodiments, upon receiving the request for the information about the content package 800, the server 408 may generate content package information including a plurality of images corresponding to a plurality of contents and data regarding some of the plurality of contents, based on the extracted at least some content folders and preview folder 862-2, and the generated content package information may be provided for use to an electronic device (e.g., 101 of FIG. 1, 401 of FIG. 4, or 601 of FIG. 6).

FIGS. 9A and 9B are views for describing data included in a content package, according to various embodiments.

Referring to FIG. 9A, data (e.g., the information file 812-4 of FIG. 8) may include information for performing an operation corresponding to each of a plurality of contents (e.g., the first through fifth content folders 810 through 850 of FIG. 8) and may include information such as version, name, effect, transfromList, sound, componentList, or sequeceList for an operation of displaying a graphic image by using at least some of a plurality of graphic objects (e.g., the graphic object folders 812-2 of FIG. 8) corresponding to contents (e.g., the first content folder 810 of FIG. 8).

The version information may be content version information, may have an integer value greater than or equal to 1, and may be mandatory information that should be included in the information file. The name information may be content name information, may have a character string value, and may be mandatorily included in the information file. The effect information may be effect information applied in the use of content, may have an effect parameter value, and may be selectively included in the information file. The transfromList information may be information for transforming target information to which content is applied, may have a transfromList array value, and may be selectively included in the information file. The sound information may be information for a sound output event, may have a character string value, and may be selectively included in the information file. The componentList information may be information about a plurality of graphic objects included in content, may have a plurality of pieces of graphic object list information, and may be mandatorily included in the information file. The sequeceList information may be information about a sequence list for at least one graphic objects to be used upon occurrence of an event, may have a sequence list array value, and may be mandatorily included in the information file.

Referring to FIG. 9B, the information file may further include a plurality of effect parameter information for effects applied in the use of content. According to various embodiments, the plurality of effect parameter information may include effect parameter information applied to the target image to which the content is applied. According to various embodiments, the effect parameter information may at least include contrast, saturation, exposure, fade, or black_white parameter information.

The contrast information may include a parameter for adjusting a contrast of the target information to which the content is applied, may have an integer value greater than or equal to −10 and less than or equal to +10, may have 0 when the contrast is not adjusted, and should be included in the information file. The saturate information may include a parameter for adjusting a saturation of the target information to which the content is applied, may have an integer value greater than or equal to −10 and less than or equal to +10, may have 0 when the saturation is not adjusted, and should be included in the information file. The exposure information may include a parameter for adjusting an exposure of the target information to which the content is applied, may have an integer value greater than or equal to −10 and less than or equal to +10, may have 0 when the exposure is not adjusted, and should be included in the information file. The fade information may include a parameter for adjusting a fade of the target information to which the content is applied, may have an integer value greater than or equal to 0 and less than or equal to 20, may have 0 when the fade is not adjusted, and should be included in the information file. The black/white information may include a parameter indicating whether the target image to which the content is applied is to be switched to a black/white mode, may have a value of 0 or 1, may have a value of 1 upon application of the black/white mode, and may be mandatorily included in the information file.

Figure 10:
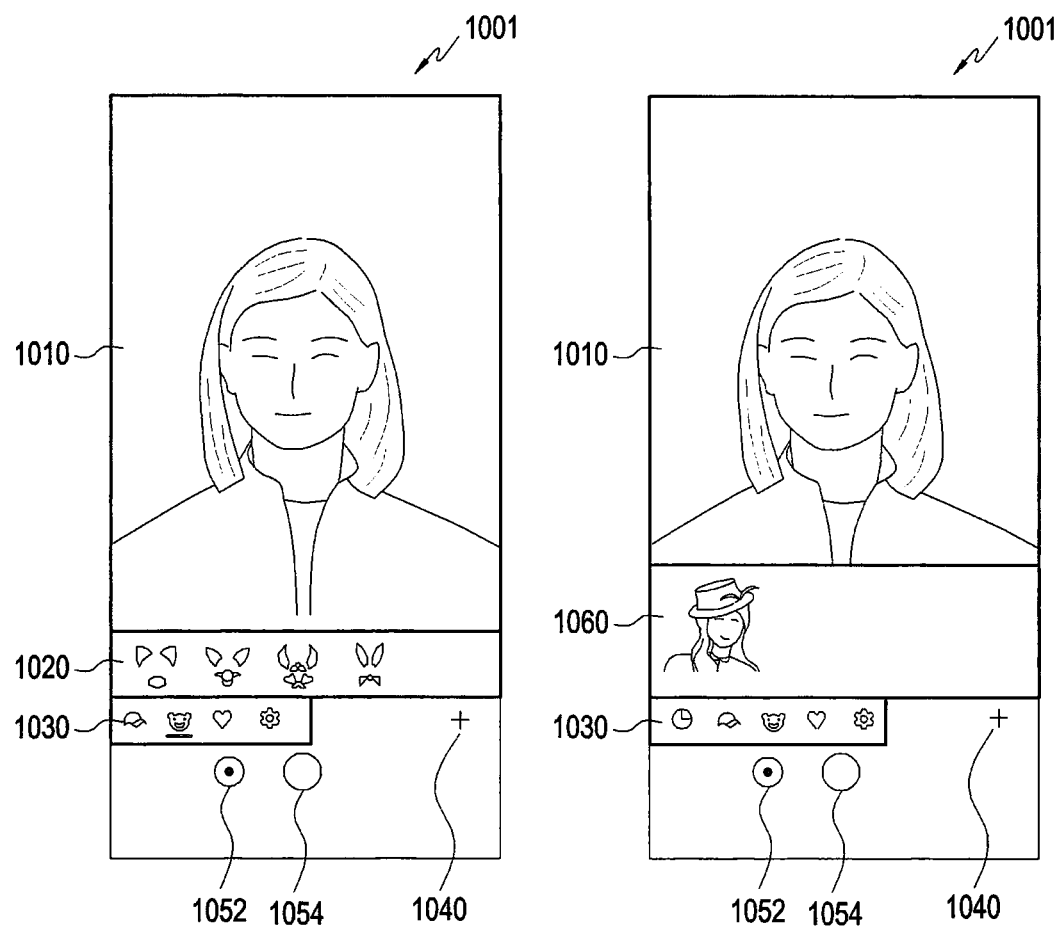
FIG. 10 illustrates an example of requesting content package information on a preview screen that displays an image obtained by a camera module, according to various embodiments.

FIG. 10 illustrates an example of requesting content package information on a preview screen that displays an image obtained by a camera module, according to various embodiments.

Referring to FIG. 10, an electronic device (e.g., 101 of FIG. 1, 401 of FIG. 4, or 601 of FIG. 6) may display a preview screen 1001 by using an image obtained through a camera module (e.g., 180 of FIG. 1 or 640 of FIG. 6). The preview screen 1001 may further include an image display region 1010 for displaying an image obtained by a camera module, a first region 1020 for displaying at least some of a plurality of images respectively corresponding to a plurality of contents, a second region 1030 for displaying a representative image indicating a content package including the plurality of images, or a first icon 1040, and a moving image capturing button 1052 or a still image capturing button 1054.

According to various embodiments, the electronic device may display representative images (or thumbnail images) of at least one content package respectively indicating at least one content package in the second region 1030, and when any one of the representative images is selected, the electronic device may display a plurality of images indicating a plurality of contents included in a content package corresponding to the selected representative image in the first region 1020. According to an embodiment, a representative image corresponding at least one content package may be displayed in the second region 1030 based on an order of recently used content packages.

According to various embodiments, upon selection of a first icon 1040, the electronic device (e.g., 101 of FIG. 1, 401 of FIG. 4, or 601 of FIG. 6) may transmit a request for information about a registered content package to a server (e.g., 108 of FIG. 1 or 408 of FIG. 4), and the server may provide registered content package registration information to the electronic device. For example, the server may provide new content package registration information or popular content package registration information. The content package registration information may include at least some of product id, product name, price, app icon, average rating, or seller name. The electronic device may receive data regarding the content package registration information and parse the data to obtain at least some of product id, product name, price, app icon (representative image), average rating, or seller name. According to various embodiments, product id may include a content package id, product name may include a content package name, price may include a content package price, app icon may include a representative image or a representative icon indicating a content package, average rating may include a content package download rate, or seller name may include content package seller information.

The electronic device may display content package registration information 1060 provided from the server on the display. For example, partial information (e.g., app icon, product name, and price information) of the content package registration information 1060 may be displayed on the display.

According to various embodiments, the electronic device may transmit a request for content package registration information to the server through the preview screen 1001 and display the received content package registration information, thereby being provided with the content package registration information without executing a separate application (e.g., an app purchase and download application) for being provided with information about registered content packages.

FIG. 11 illustrates an example of requesting content package information on a preview screen that displays an image obtained by a camera module, according to various embodiments.

Referring to FIG. 11, an electronic device (e.g., 101 of FIG. 1, 401 of FIG. 4, or 601 of FIG. 6) may display a preview screen 1101 by using an image obtained through a camera module (e.g., 180 of FIG. 1 or 640 of FIG. 6). The preview screen 1101 may further include an image display region 1110 for displaying an image obtained by a camera module, a first region 1120 for displaying at least some of a plurality of images respectively corresponding to a plurality of contents, a second region 1130 for displaying a representative image indicating a content package including the plurality of images, or a first icon 1140, and a moving image capturing button 1152 or a still image capturing button 1154.

According to various embodiments, each of the plurality of images displayed on the first region 1120 may include an image indicating a representative graphic object corresponding to each of the plurality of contents or a representative icon indicating each of the plurality of contents.

According to various embodiments, upon receiving an input to select the first icon 1140 when the preview screen 1101 is displayed, the electronic 601 may display the obtained content package information in a third region 1135. The content package information may include a plurality of images corresponding to a plurality of contents obtained from an external device and data regarding some of the plurality of contents. A representative image 1135-1 corresponding to the obtained package information may be displayed in the third region 1135, and upon selection of the representative image 1135-1, each of the plurality of images included in the obtained content package information may be displayed in the first region 1120.

According to an embodiment, among the plurality of images displayed in the first region 1120, a first image 1122 corresponding to some content available before a purchase thereof (e.g., for demonstration) and a second image 1124 corresponding to the other contents unavailable before a purchase thereof may be distinguishable from each other. The first image 1122 corresponding to the some contents for demonstration may be displayed in an original color, and the second image 1124 corresponding to the other contents unavailable before the purchase thereof may be displayed in a gray-scale color. According to various embodiments, the first image is intended for demonstration, such that a first graphic object 1122-1 corresponding to the first image may be displayed in a region corresponding to a designated object included in an image 1110 obtained by the camera, and a second graphic object corresponding to the second image may not be displayed in the region corresponding to the designated object included in the image obtained by the camera.

For example, a hat representative image 1135-1 may be displayed as at least one representative image (or a thumbnail image) indicating content package information (e.g., hat content package information) regarding a new content package in the third region 1135, and upon selection of the hat representative image 1135-1, a plurality of hat images included in the hat content package information corresponding to the selected hat representative image 1135-1 may be displayed in the first region 1120. According to various embodiments, the electronic device may display a hat image 1122 corresponding to partial hat contents including data available for demonstration among a plurality of hat images in an original color, and display hat images 1124 corresponding the other hat contents without available data in the gray-scale color. According to various embodiments, the electronic device may display a graphic image 1122-1 looking like an object wears a hat graphic object by applying the hat graphic object to a designated object of the image 1110 obtained by the camera module on a preview screen by using available data for demonstration. According to various embodiments, the user may identify on the preview screen, the graphic image 1122-1 corresponding to a case when hat contents for demonstration are used, and determine whether to purchase or download a content package for displaying the graphic image 1122-1 corresponding to the hat contents after identification of demonstration, without executing a separate application (e.g., the app purchase and download application) for being provided with the content package information. In response to a request for purchasing or downloading the content package for displaying the graphic image 1122-1 corresponding to the hat content from the user, the electronic device may purchase or download the requested content package.

Figure 12A:
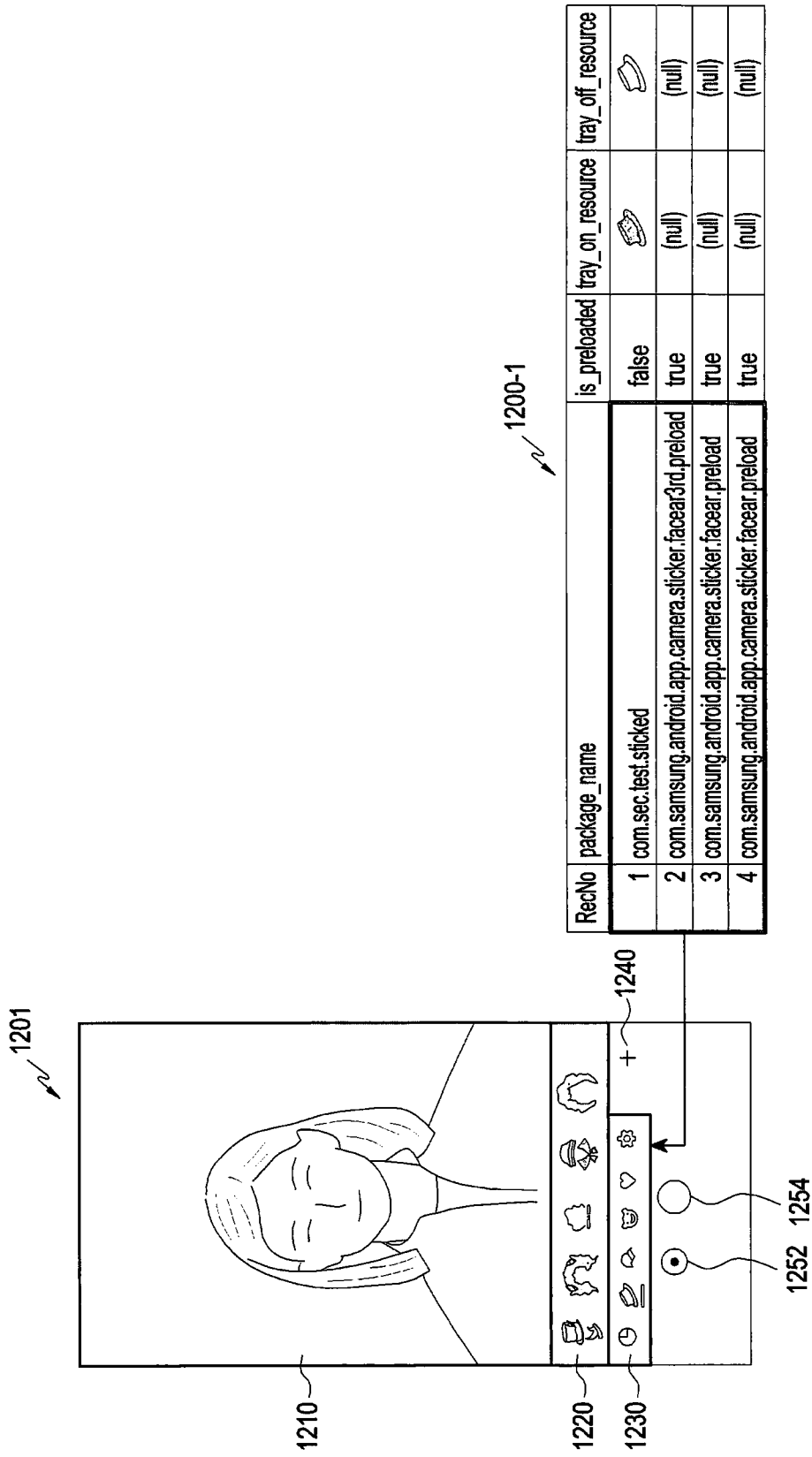
FIGS. 12A and 12B illustrate an example of a database table of a content package, according to various embodiments.
Figure 12B:
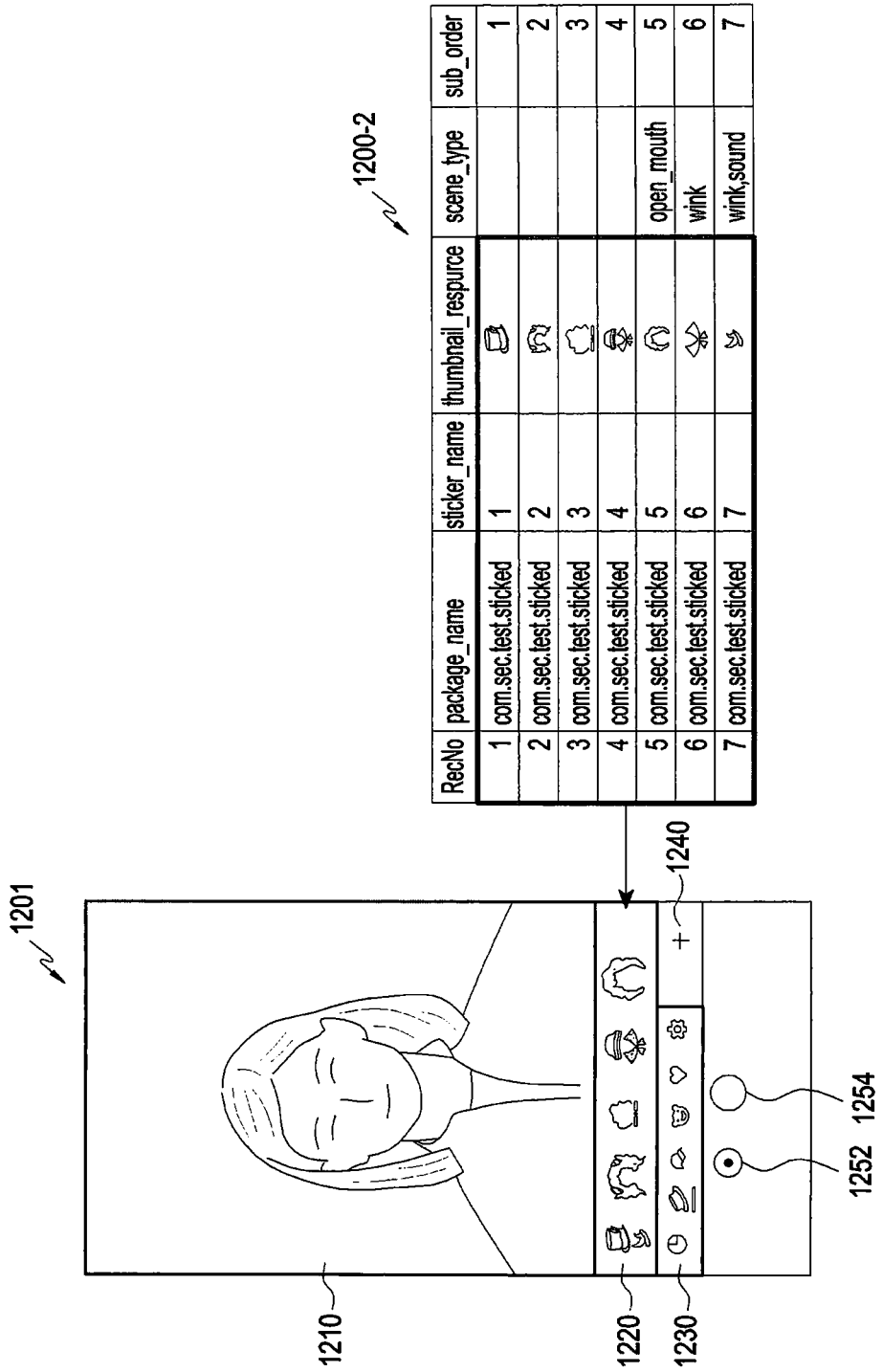

FIGS. 12A and 12B illustrate an example of a database table of a content package, according to various embodiments.

Referring to FIG. 12A, an electronic device (e.g., 101 of FIG. 1, 401 of FIG. 4, or 601 of FIG. 6) may store a content package database 1200-1 in a memory (e.g., 130 of FIG. 1 or 630 of FIG. 6).

The content package database 1200-1 may include information about at least one content package for displaying a representative image in a second region 1230 displayed together with an image display region 1210 in a preview screen 1201. For example, the content package database 1200-1 may further include a name (package_name) of at least one content package displayed in the second region 1230, information (is_preloaded) indicating whether each of the at least one content package is included (or downloaded) in the electronic device by default, or tray on/off image (tray_on_resource/tray_off_resource) corresponding to each of the at least one content, and may also include other information. The tray on image may be an image indicating that the plurality of images included in the content package information are being displayed in a first region 1220, and the tray off image may be an image indicating that the plurality of images included in the content package information are not being displayed in the first region 1220.

Referring to FIG. 12B, an electronic device (e.g., 101 of FIG. 1, 401 of FIG. 4, or 601 of FIG. 6) may store a content package database 1200-2 for a plurality of contents included in a content package in a memory (e.g., 130 of FIG. 1 or 630 of FIG. 6).

The content package database 1200-2 for the plurality of contents may include information about a plurality of contents included in the first region 1220 displayed together with the image display region 1210 on the preview screen 1201. For example, the database 1200-2 for the plurality of contents may include a name (package_name) of a content package including the plurality of contents displayed in the first region 1220, a name (sticker_name) of each of the plurality of contents, a representative image (thumbnail_resource) of each of the plurality of contents, a scene type (scene_type) of each of the plurality of contents, or an order (sub_order) of each of the plurality of contents and may also include other information. According to various embodiments, the scene type of each of the plurality of contents may be a designated type for indicating where and how to apply at least some of a plurality of graphic objects of content according to a state (e.g., a front, a side, etc.) of a designated object (e.g., a face) included in an image of the preview screen 1201. For example, for "open_mouth", when an object is a mouth of a face and the mouth is open, the type may indicate that at least some of a plurality of graphic objects may be displayed or changed and displayed, suitably for a mouth-open state; for "wink", when eyes of the object are in a wink state, the type may indicate that at least some of the plurality of graphic objects may be displayed or changed and displayed, suitably for the wink state; and for "sound", when a particular sound is input by the object, the type may indicate that at least some of the plurality of graphic objects may be displayed or changed and displayed, suitably for the input sound. According to various embodiments, the scene type may also be generated or designated as various types.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

As used herein, the term "module" may mean, for example, a unit including one of or a combination of two or more of hardware, software, and firmware. The "module" may be interchangeably used with a unit, logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with instructions stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

According to various embodiments, in a computer-readable non-transitory storage medium having stored therein a program for providing contents associated with a camera function according to various embodiments of the present disclosure, the stored program causes the electronic device to perform operations of obtaining a plurality of images corresponding to a plurality of contents and data regarding at least part of the plurality of contents from an external device, displaying an image obtained using a camera module through a display of the electronic device, displaying at least part of the plurality of images in a designated region of the display while displaying the image obtained using the camera module, and displaying a graphic image in a region corresponding to a designated object included in the image obtained using the camera module, by using the data, upon obtaining an input related to a first image from among the at least part of the plurality of images.

The computer readable recording medium may include a hard disk, a floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions may include a machine language code created by a compiler and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted, or may have additional different operations.

The electronic device according to various embodiments of the present disclosure is not limited by the above-described embodiments and drawings, and it would be apparent to those of ordinary skill in the art that various substitutions, modifications, and changes in the technical scope of the present disclosure may be possible.

The invention claimed is:

1. An electronic device comprising:
   a display;
   a camera module;
   a communication circuit; and
   a processor, wherein the processor is configured to:
   obtain a plurality of first images corresponding to a plurality of content items and data regarding a first content item among the plurality of content items from an external device, by using the communication circuit, upon activation of the camera module through execution of a first application, wherein the plurality of content items include the first content item available prior to purchase and a second content item available after the purchase;
   display a second image obtained by using the camera module through the display;
   display at least one partial image among the plurality of first images in a designated region of the display, while displaying the second image; and
   display a graphic object corresponding to a third image in a region of a designated object included in the second image by using the data, upon obtaining a first input related to the third image corresponding to the first content items among the at least one partial image.

2. The electronic device of claim 1, wherein the data regarding the first content item available prior to purchase comprises a plurality of graphic objects to be displayed in the region corresponding to the designated object.

3. The electronic device of claim 1, wherein the processor is further configured to display a user interface for downloading a plurality of graphic objects corresponding to the second content item, upon obtaining a second input related to a fourth image corresponding to the second content item from among the plurality of first images.

4. The electronic device of claim 3,
   wherein the processor is configured to display the third image and the fourth image using different display schemes.

5. The electronic device of claim 4, wherein the processor is configured to display the third image in an original color and the fourth image in a gray-scale-processed color.

6. The electronic device of claim 1, further comprising a memory electrically connected with the processor,
   wherein the memory stores the obtained plurality of first images corresponding to the plurality of content items and the data regarding the first content item available prior to purchase among the plurality of content items.

7. The electronic device of claim 1, wherein the processor is configured to display at least one partial image among the plurality of images in a first region of the display, and a plurality of representative images indicating the plurality of content items in a second region of the display, while displaying the second image.

8. The electronic device of claim 1, wherein the processor is configured to obtain the plurality of first images corresponding to the plurality of content items and the data regarding the first content item available prior to purchased among the plurality of content items in response to an input made through a first icon displayed on the display, while displaying the second image.

9. A method for providing content items associated with a camera function in an electronic device, the method comprising:
- obtaining a plurality of first images corresponding to a plurality of content items and data regarding a first content item among the plurality of content items from an external device, upon an activation of a camera module of the electronic device through execution of a first application, wherein the plurality of content items include the first content item available prior to purchase and a second content item available after purchase;
- displaying a second image obtained by using the camera module through a display of the electronic device;
- displaying at least one partial image among the plurality of first images in a designated region of the display, while displaying the second image;
- displaying a graphic object corresponding to a third image in a region of a designated object included in the second image by using the data, upon obtaining a first input related to the third image corresponding to the first content items among the at least one partial image.

10. The method of claim 9, wherein the data regarding the first content item available prior to purchase comprises a plurality of graphic objects to be displayed in the region corresponding to the designated object.

11. A non-transitory storage medium having stored therein a program for providing content items associated with a camera function,
- wherein the program causes the electronic device to perform operations of:
- obtaining a plurality of first images corresponding to a plurality of content items and data regarding a first content item among the plurality of content items from an external device, upon an activation of a camera module of the electronic device through execution of a first application, wherein the plurality of content items include the first content item available prior to purchase and a second content item available after purchase;
- displaying a second image obtained by using the camera module through a display of the electronic device;
- displaying at least one partial image among the plurality of first images in a designated region of the display, while displaying the second image;
- displaying a graphic object corresponding to a third image in a region of a designated object included in the second image by using the data, upon obtaining a first input related to the third image corresponding to the first content items among the at least one partial image.

* * * * *